United States Patent
Lai et al.

(10) Patent No.: US 6,895,000 B2
(45) Date of Patent: May 17, 2005

(54) INTERNET PHONE USING A USB INTERFACE TO TRANSMIT SIGNALS

(75) Inventors: Cheng-Shing Lai, Taipei (TW); Jing-Song Wu, Nanjing (CN)

(73) Assignee: Inventec Appliances Corp., Taipei (TW)

( * ) Notice: Subject to any disclaimer, the term of this patent is extended or adjusted under 35 U.S.C. 154(b) by 817 days.

(21) Appl. No.: 09/772,914

(22) Filed: Jan. 31, 2001

(65) Prior Publication Data

US 2002/0101855 A1 Aug. 1, 2002

(51) Int. Cl.$^7$ .................................... H04L 12/66
(52) U.S. Cl. ............... 370/352; 370/357; 370/389; 455/557; 379/900; 379/88.17
(58) Field of Search .................. 370/352, 353, 370/357, 389, 493, 522, 349, 527, 528, 355, 222; 375/222; 379/399.01, 93.05, 398, 394, 413, 387.02, 390.04, 413.01, 395.01, 402, 403, 404, 388.06, 391, 93.15, 387.01, 900, 88.17, 413.02; 455/557; 709/203, 217, 219, 250, 226

(56) References Cited

U.S. PATENT DOCUMENTS

| | | | |
|---|---|---|---|
| 6,640,239 B1 * | 10/2003 | Gidwani | 709/203 |
| 6,681,121 B1 * | 1/2004 | Preston et al. | 455/556.1 |
| 6,690,681 B1 * | 2/2004 | Preston et al. | 370/493 |
| 6,731,751 B1 * | 5/2004 | Papadopoulos | 379/399.01 |
| 6,732,143 B1 * | 5/2004 | Saulsbury | 709/203 |
| 2002/0071424 A1 * | 6/2002 | Chiu et al. | 370/352 |

* cited by examiner

*Primary Examiner*—Wellington Chin
*Assistant Examiner*—Jamal A. Fox
(74) *Attorney, Agent, or Firm*—Birch, Stewart, Kolasch & Birch, LLP

(57) ABSTRACT

The invention discloses an Internet phone transmitting signals through a USB interface, which comprises a thin client and a digital phone. The USB interface connects the thin client and the digital phone. The phone communication is achieved through the online function of the thin client. The voice message sending procedure transmits outgoing message signals to the thin client through the USB interface. The thin client converts the outgoing message signals into an outgoing message VOIP package. The outgoing message VOIP package is then transmitted through a network to a target. The voice message receiving procedure transmits an incoming message VOIP package from the target back to the thin client through the network and converts the incoming message VOIP package into incoming message signals. Further through the USB interface, the incoming message signals are transmitted to the digital phone. Finally, the voice message receiving procedure completes by outputting the incoming message signals through the digital phone.

9 Claims, 3 Drawing Sheets

INTERNET PHONE USING A USB INTERFACE TO TRANSMIT SIGNALS

BACKGROUND OF THE INVENTION

1. Field of Invention

The present invention relates to an Internet phone and, in particular, to an Internet phone that transmits signals through a USB interface.

2. Related Art

The development of thin clients (including windows terminals, network terminals) has been turning to extremely thin clients in order to follow the trend in light, thin, and miniaturized electronic products. This provides superiority in reducing costs so as to have a competitive power in the thin client market.

The usual voice over Internet phone (VOIP) refers to the software, hardware and technologies in transmitting digital data through the IP packages on the Internet. Its main objective is to make long distance phone calls cheaper. However, both the VOIP structure and cost are extremely complicated and expensive. If a thin client with the online function can be utilized to provide the Internet phone function, the thin client will have more extra values in applications.

SUMMARY OF THE INVENTION

It is a primary objective of the invention to add extra functions to thin clients with the online function and a digital phone connected through a USB interface so as to provide the online and telephone functions.

The Internet phone transmitting data through a USB interface includes a voice message sending procedure and a voice message receiving procedure.

First, the voice message sending procedure receives outgoing message signals through a digital phone. The input signals are transmitted to a thin client through the connected USB interface. The thin client converts the outgoing message signals into an outgoing message VOIP package. Finally, the VOIP package is stored on a local area network and further transmitted to a target through the Internet.

The voice message receiving procedure transmits an incoming message VOIP package from the target back to the local area network through the Internet. The thin client converts the incoming message VOIP package into incoming message signals. Further through the connected USB interface, the incoming message signals are transmitted to the digital phone. Finally, the incoming message signals are output through the digital phone.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 1:
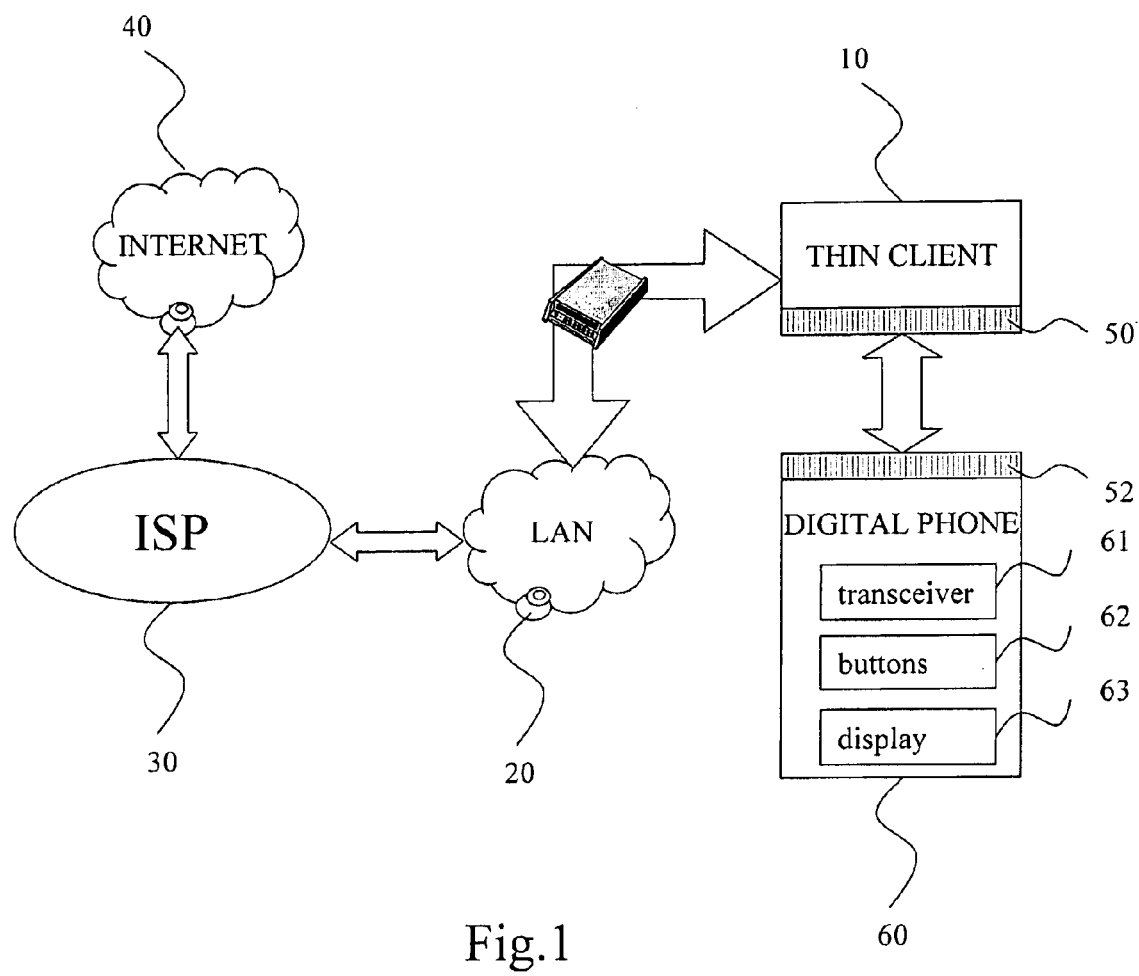
FIG. 1 shows a hardware structure of the disclosed Internet phone that transmits signals through a USB interface.

Nowadays, thin clients only provide the online function. In view of needs for multidimensional applications, the present invention provides a thin client with the Internet phone function. The hardware structure is shown in FIG. 1. Usually, a thin client 10 connects to the Internet 40 through the connection to a local area network (LAN) 20 and an Internet service provider (ISP) 30. The thin client 10 has a USB interface port 50 for coupling to a digital phone 60. The digital phone 60 also has a USB interface port 52.

The digital phone 60 further has a transceiver 61, buttons 62, and a display 63. The LAN 20 connecting the thin client 10 and the ISP 30 can be a cable modem or an asymmetric digital subscriber line (ADSL) modem. Through the Ethernet network protocol, the above-mentioned thin client 10 is then equipped with the online function.

Figure 2:
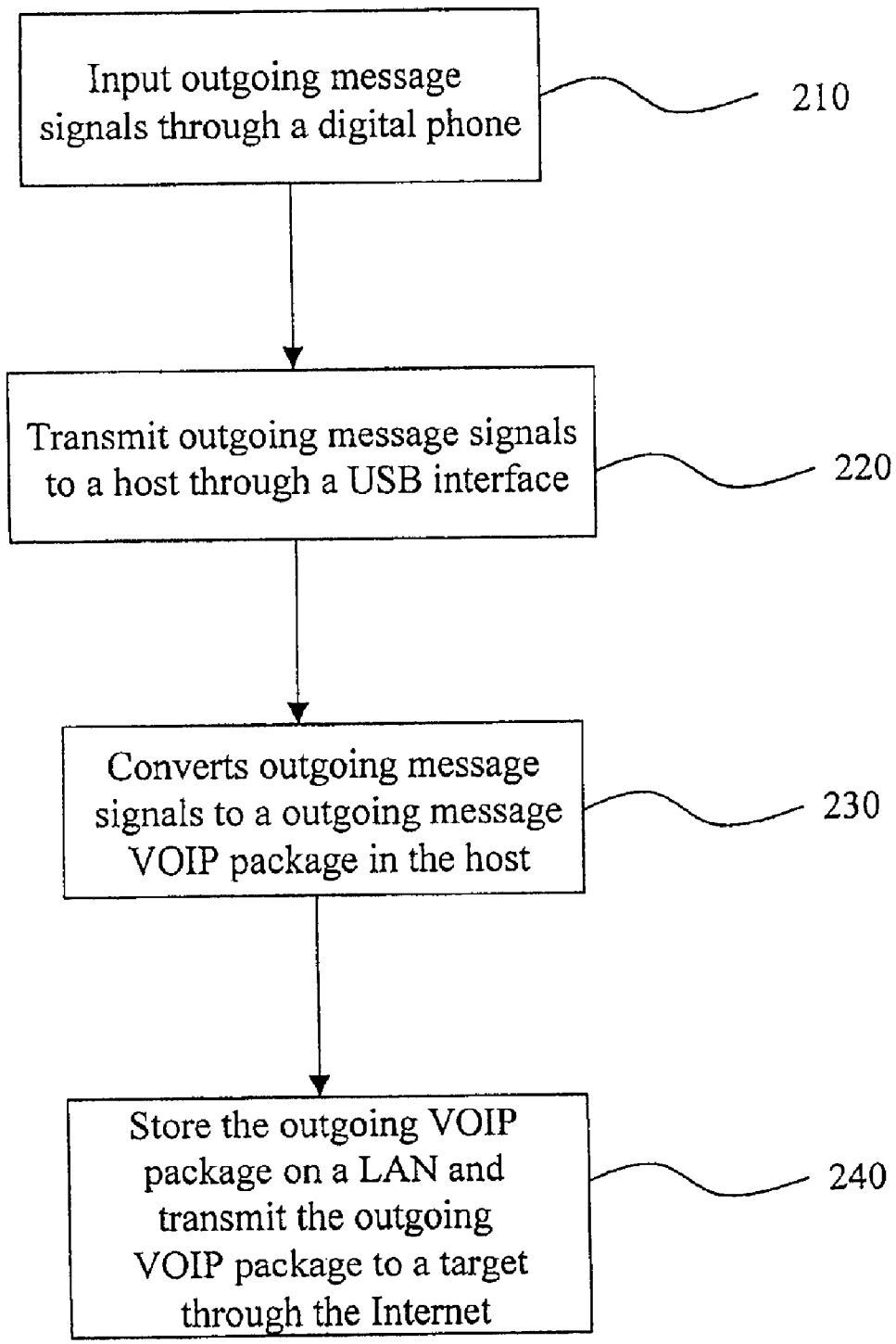
FIG. 2 shows an outgoing message sending flowchart of the disclosed Internet phone that transmits signals through a USB interface.

With reference to FIG. 2, outgoing message signals are entered through a digital phone 60 (step 210). The outgoing message signals are then transmitted to a host through a USB interface 50, 52 (step 220). The host can be a thin client 10 or an online machine which converts the outgoing message signals into outgoing message VOIP package (step 230). Finally, the outgoing message VOIP package is stored in an LAN 20 and then transmitted to a target through the Internet 40 (step 240).

Figure 3:
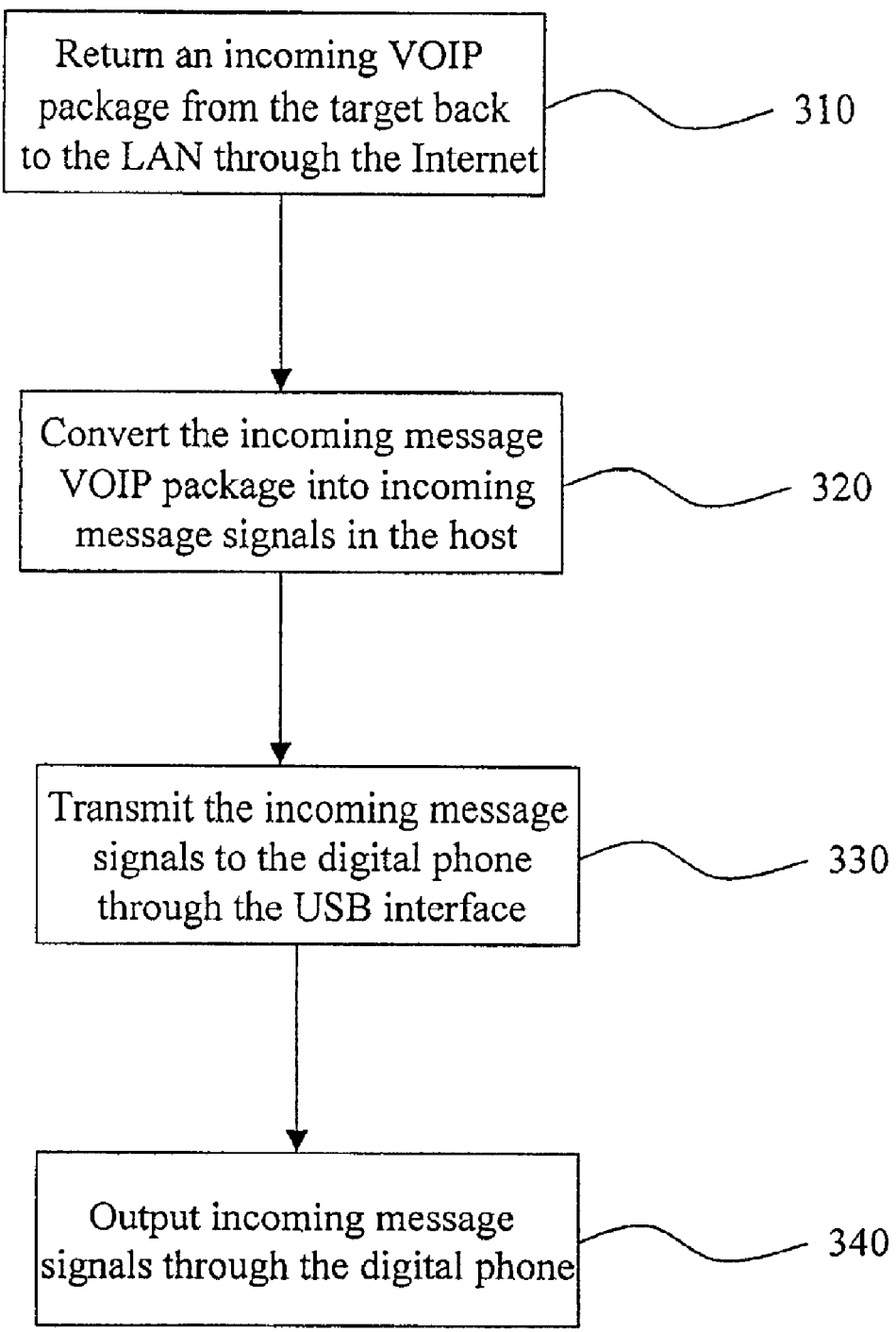
FIG. 3 shows an incoming message receiving flowchart of the disclosed Internet phone that transmits signals through a USB interface.

With reference to FIG. 3, an incoming message VOIP package is transmitted from the target back to the LAN 20 through the Internet 40 (step 310). The host then converts the incoming message VOIP package into incoming message signals (step 320). The host further transmits the incoming message signals to the digital phone 50 through the USB interface 50, 52 (step 330). Finally, the incoming message signals are output through the digital phone (step 340).

The invention is featured in a digital phone 50 with a USB data transmission interface and utilizes the existing online function of a thin client 10 to connect the thin client 10 and the digital phone 50 through a USB interface, so that the combination has the function of a telephone in addition to that of a thin client 10.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An Internet phone that transmits signals through a USB interface, the Internet phone comprising a thin client and a digital phone with the USB interface connecting in between so that with the online function of the thin client a telephone conversation can be achieved, wherein the telephone conversation procedure comprises the steps of:

inputting outgoing message signals through the digital phone;

transmitting the outgoing message signals to the thin client through the USB interface;

converting the outgoing message signals into an outgoing message VOIP (voice over Internet phone) package in the thin client;

storing the outgoing message VOIP package on a local area network (LAN) and transmitting the outgoing message VOIP package to a target through the Internet;

returning an incoming message VOIP package from the target to the LAN through the Internet;

converting the incoming message VOIP package into incoming message signals in the thin client;

transmitting the incoming message signals to the digital phone through the USB interface; and outputting the incoming message signals through the digital phone.

2. The Internet phone of claim 1, wherein the thin client comprises a windows terminal and a network terminal.

3. The Internet phone of claim 1, wherein the digital phone further comprises a transceiver, buttons, and a display.

4. An Internet phone that transmits signals through a USB interface, the Internet phone comprising a thin client and a digital phone with the USB interface connecting in between so that with the online function of the thin client a telephone conversation can be achieved, wherein the telephone conversation procedure comprises the steps of:

inputting outgoing message signals through the digital phone;

transmitting the outgoing message signals to the thin client through the USB interface;

converting the outgoing message signals into an outgoing message VOIP (voice over Internet phone) package in the thin client; and storing the outgoing message VOIP package on a local area network (LAN) and transmitting the outgoing message VOIP package to a target through the Internet.

5. The Internet phone of claim 4, wherein the thin client comprises a windows terminal and a network terminal.

6. The Internet phone of claim 4, wherein the digital phone further comprises a transceiver, buttons, and a display.

7. An Internet phone that transmits signals through a USB interface, the Internet phone comprising a thin client and a digital phone with the USB interface connecting in between so that with the online function of the thin client a telephone conversation can be achieved, wherein the telephone conversation procedure comprises the steps of:

returning an incoming message VOIP package from the target to the LAN through the Internet;

converting the incoming message VOIP package into incoming message signals in the thin client;

transmitting the incoming message signals to the digital phone through the USB interface; and outputting the incoming message signals through the digital phone.

8. The Internet phone of claim 7, wherein the thin client comprises a windows terminal and a network terminal.

9. The Internet phone of claim 7, wherein the digital phone further comprises a transceiver, buttons, and a display.

* * * * *